May 3, 1960

G. L. JONES ET AL 2,935,630

HYSTERESIS ELECTRIC MOTOR

Filed April 7, 1958

MAGNETICALLY HARD
MAGNETICALLY SOFT

INVENTORS:
GEORGE H. BATEMAN
GEORGE L. JONES
BY
Kegan, Bellamy & Kegan
Attys.

May 3, 1960  G. L. JONES ET AL  2,935,630
HYSTERESIS ELECTRIC MOTOR

Filed April 7, 1958  2 Sheets-Sheet 2

INVENTORS:
GEORGE H. BATEMAN
GEORGE L. JONES
BY
Kegan, Bellamy & Kegan
Att'ys.

United States Patent Office 2,935,630
Patented May 3, 1960

2,935,630

HYSTERESIS ELECTRIC MOTOR

George L. Jones, Marne, and George H. Bateman, Grand Rapids, Mich., assignors, by mesne assignments, to Divco-Wayne Corporation, a corporation of Michigan Application April 7, 1958, Serial No. 726,777

6 Claims. (Cl. 310—67)

This invention relates to a hysteresis electric motor, being an electric motor of the induction type wherein the torque for inducing rotation arises from the hysteresis characteristic of the magnetic material comprising the one of the two relatively rotatable parts of the motor which interacts with a changing magnetic field electrically generated in the other part.

A principal object of the invention is to provide a motor of the foregoing character which may be readily and economically produced and is efficient in operation.

A further object is to provide a motor of the noted character which can be readily produced in miniature form as a reliable synchronous motor for use in applications where compactness and lightness are major factors, such as in gyroscopic apparatus for use in air-borne or space-borne missiles or vehicles.

An induction motor comprises a stator and a rotor separated by an operating magnetic gap. One of these parts is a wound electromagnetic part which may be termed the inductor. The other part may be termed the follower without reference to whether it is in the stator or the rotor, in that it is magnetized by induction across the operating magnetic gap. A variable energization of the windings of the inductor provides an effective rotating magnetic field therein which reacts with the follower across the operating gap to produce a torque.

In a hysteresis induction motor, the follower is composed of magnetic material having a sufficient residual-flux or hysteresis characteristic, or magnetic hardness, to provide the desired rotative torque by reaction with the inductor field.

For the most part, induction motors have been so constructed that there is a single operating magnetic gap, restricting the inductor and the follower to one magnetic pole face each. Consequently, fullest use of the magnetic structure has not been made, which has rendered it difficult to design induction motors in efficient compact miniaturized form.

According to the invention, operating efficiency is greatly improved by providing two separate operating magnetic gaps which act in unison to provide rotative torque. In the illustrated preferred embodiment, the two operating gaps are magnetically in parallel, and one of them makes use of otherwise parasitic leakage flux.

A feature of the disclosed embodiment is that the two operating magnetic gaps are concentric inner and outer gaps, and the inductor is in the form of a radially wound annulus or toroid, the inner and outer surfaces of which are separated from the respective follower surfaces by the respective operating gaps.

Another feature is that the windings of the inductor annulus are imbedded in the magnetic material to promote efficiency of magnetic induction by permitting the operating magnetic gaps to be as small as is mechanically feasible.

A further feature is that the follower comprises a cylindrical outer part surrounding the inductor and a cylindrical inner part lying within the inductor, with both follower parts being made of material having a suitable torque-inducing hysteresis characteristic.

According to a related feature, the two follower parts comprise outer and inner tubular portions of a unitary cup structure, which simplifies manufacture and assembly.

The above mentioned and other features and objects of this invention and the matter of attaining them will become more apparent, and the invention itself will be best understood, by reference to the following description of an embodiment of the invention taken in conjunction with the accompanying drawings comprising Figs. 1 to 7, wherein.

Figure 1:
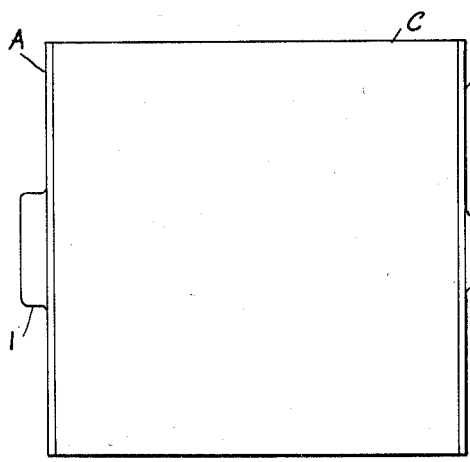
Figs. 1 and 2 are respectively a front view and a left-end view of a completely housed motor constructed according to the invention.
Figure 2:
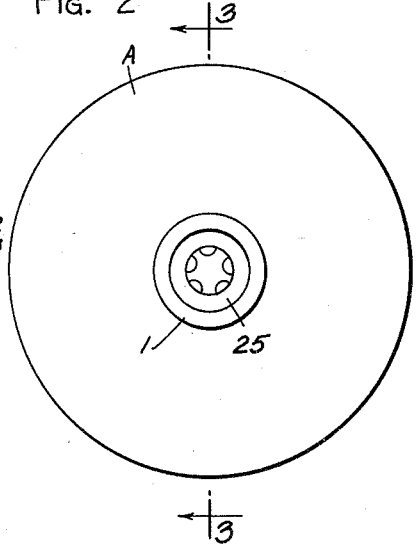

The illustrated motor is shown on an enlarged scale which has been varied from view to view according to the nature of the illustration. The motor is contained within a housing having an overall diameter of about one inch. The housed motor is arranged to rotate about an axis passing through the center of housing parts A, B and C. One bearing for this purpose is provided at 25 (Fig. 2) in boss 1 of plate A, and another in the outer end (not shown) of the hollow extension 2 of plate B. Extension 2 contains the driving wires W1 to W3 through which the motor is energized. For complete freedom of rotation of the housed motor, wires W1 to W3 may be connected to their source of driving current (not shown) through conventional slip rings and brushes (not shown).

Figure 3:
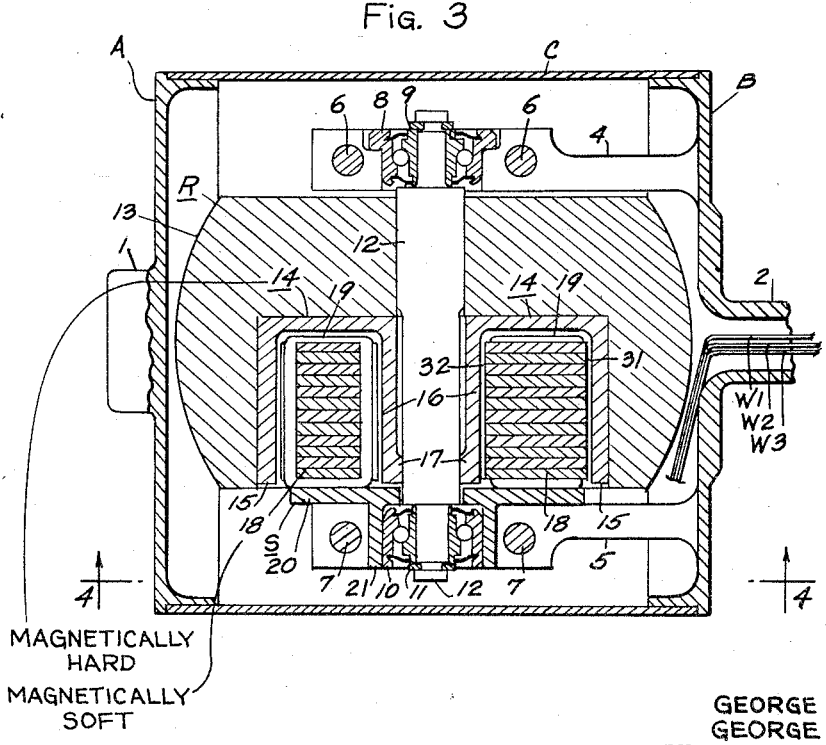
Fig. 3 is a front sectional view of the motor of Figs. 1 and 2, taken generally along line 3—3 of Fig. 2.

As seen best in sectional view in Fig. 3, the motor comprises a stator assembly S and a rotor assembly R, mounted on legs 4 and 5 attached to end plate B, as by being die-cast therewith. The retaining portion of legs 4 and 5 is of split construction and held together by screws 6 and 7, as shown in Fig. 4 for leg 5, retainer cap 22, and screws 7.

Stator assembly S comprises essentially the laminated magnetic core 18 in annular or tubular form, the lumped toroidal windings 19 imbedded therein, and the mounting plate 20 to which the wound stator core is firmly attached as by a suitable bonding material. Mounting plate 20 carries a hollow hub 21, clamped firmly between parts 5 and 22 as seen best in Fig. 4.

The rotor assembly R comprises essentially the rounded gyroscope weight 13 (preferably of a heavy metal which may be either magnetic or non-magnetic), the hysteresis cup 14 of magnetically hard material, and the central shaft 12 which carries the parts 13 and 14 for free rotation about the axis of shaft 12 with a small inner and outer clearance gaps between the rotor and stator parts. Parts 12, 13, and 14 may be press-fitted together, portion 16 of cup 14 being inwardly thickened at 17 to facilitate this operation.

Figure 4:
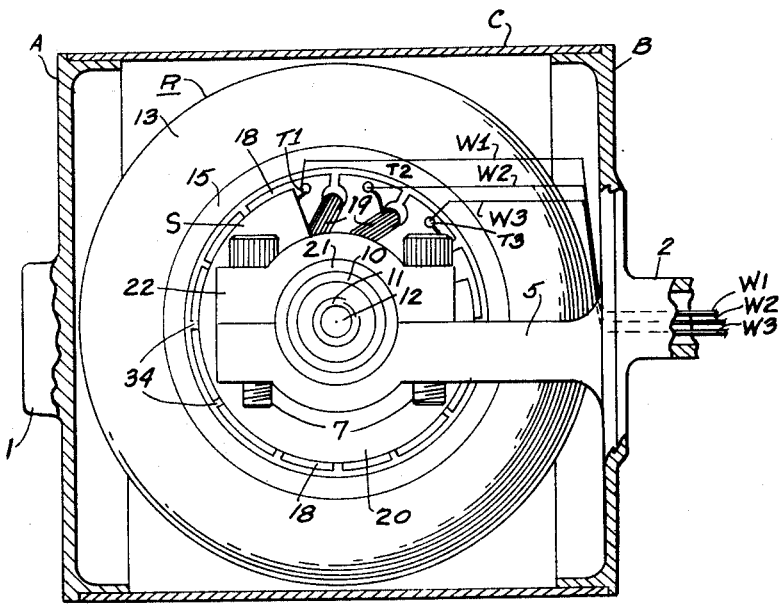
Fig. 4 is an end view of the motor structure looking up along line 4—4 of Fig. 3, with parts of the housing broken away.

A ball bearing 8 of conventional construction is provided for one reduced end of shaft 12 and is clamped in place by screws 6 between the semicircular receiving portion of leg 4 and a retainer cap (not shown) similar to cap 22 of Fig. 4. A similar ball bearing 10 is provided for the other end of shaft 12, and is received snugly within the cylindrical recess in mounting hub 21. End play of shaft 12 is limited by conventionad C-rings 9 and 10.

Figure 7:
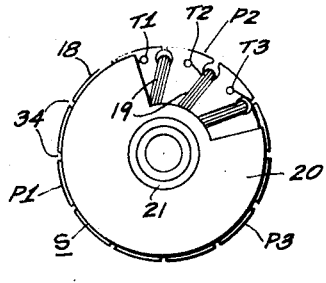

As seen best in Figs. 4 and 7, mounting plate 20 of stator assembly S is generally circular, but has a segment removed to give access to terminals T1 to T3, which may take any suitable or desired form, such as small eyelets or studs which may be insulatedly bonded to the stator core 18.

Referring to Figs. 3 and 5 to 7, the stator core 18 comprises a stack of similar ring-like laminations which are placed together in stacked relationship with their respective openings in alignment and are preferably bonded in that position before being wound, as by suitable resin.

Figure 5:
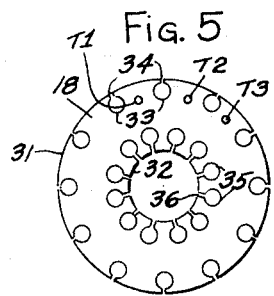
Figs. 5 to 7 show the inductor of the motor in successive stages of assembly.

The assembled and bonded stator 18 of Fig. 5 is next supplied with a lumped toroidal winding in the form of a succession of interconnected individual windings 19. In the illustrated example, the motor is arranged to be driven by three-phase alternating current received over wires W1 to W3, and stator core 18 has 12 individual windings 19 interconnected in three sets of four windings each, according to the well-known star formation employed in three phase working. It will be understood, of course, that the equally well-known delta formation of interconnecting windings 19 could be used if desired.

As illustrated, the windings 19, are imbedded or recessed within stator core 18 to permit the outer surface 31 and inner surface 32 of 18 to be brought as close to the adjacent surfaces of the respectively cooperating cup parts 15 and 16 as is mechanically feasible.

Experimental structures in which the stator core 18 is not recessed, but is provided with a distributed spiral winding on the surface have been tested and found operative, but the reduced efficiency of the structure in converting electrical energy into mechanical energy has been such as to cause an undesirably great amount of heat dissipation, largely because of the required additional length of the magnetic working gap to accommodate the windings, keeping in mind that the specific reluctance of air is about 1000 times that of magnetic iron.

In the illustrated example twelve windings 19 are provided. They are accommodated in twelve outer longitudinal openings 33 and an equal number of inner longitudinal openings 35. Openings 33 and 35 are connected to the outer and inner surfaces 31 and 32 by outer slots 34 and inner slots 36, which serve to admit the winding to the openings 33 and 35 when windings 19 are being applied. Slots 34 and 36 serve the further purpose of lessening the tendency for parasitic leakage flux to flow locally in short circuited relationship to any recessed winding 19.

Inner openings 35 are in staggered relationship to the outer opening 34, placing the inner and outer openings somewhat farther apart than a radial alignment, thereby providing an increased cross section of magnetic material encircled by any winding 19. Each of the windings 19 may comprise several turns of enameled or otherwise insulated wire sufficiently small in diameter to pass through the inner and outer slots 34 and 36, and they may be applied from a shuttle which is passed around and through the structure.

Figure 6:
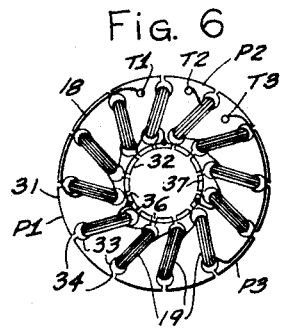

As seen best in Fig. 6, the 12 windings 19 occupy twelve equally spaced positions around core 18, which positions may be considered as numbered from 1 to 12 to correspond with the numbering on the face of the usual clock.

The four windings 19 in clock positions 9 to 12 are connected in series with each other between terminal T1 and an inner tie ring 37, common to the three sets of windings; the four windings in clock positions 1 to 4 are connected in series with each other between terminal T2 and tie ring 37; and the four windings in clock positions 5 to 8 are connected in series with each other between terminal T3 and tie ring 37. Tie ring 37 is the electrical neutral point of the star-connected winding system. It may comprise a small stamped ring of conducting material, or it may represent merely a common point to which the inner terminals of windings 1, 5 and 9 are brought and connected together.

After the windings 19 have been applied and interconnected as described in connection with Fig. 6, mounting plate 20, with its integral mounting hub 21, may next be applied to the wound stator core of Fig. 6, as by a suitable resin bond between it and the windings and the stator core to provide the stator assembly S of Figs. 4 and 7. Stator assembly S and the rotor assembly R may then be assembled with the legs 4 and 5 of end plate B to provide the assembly of Figs. 3 and 4, following which the wires W1 and W3 may be connected respectively to terminals T1 to T3 of the stator assembly. Following this step and such testing as may be desired, the housing assembly may be completed by sliding the members A, B and C together in tight-fitting relationship.

OPERATION

When the illustrated motor is to be operated, three-phase alternating current is supplied thereto over wires W1 to W3, causing alternating current to flow in each of these conductors according to the usual 120° displacement arrangement to cause effective magnetic poles to appear at pole locations P1 to P3 (Figs. 6 and 7). The magnetic polarity and intensity of any one of the three pole locations P1 to P3 at any instant appears at the next succeeding pole 120 electrical degrees later within the cycle of alternation, thus producing the well-known rotating field common to apparatus powered by three-phase alternating current.

Referring to Figs. 4 and 6, consider, for example, the condition obtaining when there is a maximum positive flow of current from conductor W1 and through terminal T1 to the four windings 19 in positions 9 to 12. This current traverses the common tie conductor 37 and returns equally over conductors W2 and W3, passing in reverse direction through the two sets of windings associated with terminals T2 and T3. There is then generated a flux flow through the four windings associated with W1 and T1 which is counterclockwise within core 18, from P2 to P1, generating a south pole at T2 and a north pole at T1. The magnetomotive force thus generated between locations P2 and P1 is caused to emerge from core 18 at these points by the equal and opposite clockwise magnetomotive force generated by the noted reverse flow of current through windings 19 in locations 1 to 8.

The following progression table shows, for six significant equally-spaced instants $T=1$ to $T=6$ in a single cycle of current over W1, the current and magnetic conditions, obtaining in W1 to W3 and at locations P1 to P3:

*Progression table*

| Time | W1 | W2 | W3 | P1 | P2 | P3 |
|---|---|---|---|---|---|---|
| $T=1$ | +1 | −.5 | −.5 | N | S | O |
| $T=2$ | +.5 | +.5 | −1 | N | O | S |
| $T=3$ | −.5 | +1 | −.5 | O | N | S |
| $T=4$ | −1 | +.5 | +.5 | S | N | O |
| $T=5$ | −.5 | −.5 | +1 | S | O | N |
| $T=6$ | +.5 | −1 | +.5 | O | S | N |

In the above progression table, for any instant $T=1$ to $T=6$, the polarity of current flow through the supply wires W1 to W3 is indicated by plus and minus symbols, and its value is given with respect to maximum. The progression table also shows, for the noted series of six instants, the progression of north (N) south (S) and neutral (O) of polarities of pole locations P1 to P3 of the stator inductor.

It will be understood of course that each of the pole locations P1 to P3, when magnetized either north or south as described and shown in the table, represents a pole face extending axially along the structure both on the outside surface 31 and on the inner surface 32 of stator core 18. The flux emanating from, or drawn to, any one of the pole locations P1 to P3 thus reaches both the outer surface of the inner hysteresis cylinder 16 and the inner surface of the outer hysteresis cylinder 15 of the magnetically hard hysteresis-cup structure 14.

Considering the rotor assembly to be stationary with respect to the stator assembly, when any pole location P1 to P3 is magnetized, a corresponding pole location along the inner surface of 15 and the outer surface of 16 is magnetized in an agreeing flux direction to establish a pole at that location on each part 15 and 16 of the opposite polarity.

Since the hysteresis cup 14 of the rotor assembly R is magnetically hard, it tends to retain the magnetic condition impressed thereon at any one of the six tabulated instants. Consequently, the noted clockwise progression or rotation of the magnetic field around the wound stator core 18 tends (by a combination of repulsion and attraction) to rotate cup 14 and the remainder of the motor assembly R clockwise with the rotation of the magnetic field. The rotational inertia of the rotor assembly R is such that the rotor cannot begin instantly to rotate as fast as the magnetic field of the inductor rotates. Slippage thus occurs until synchronous speed is attained, when the rotor is rotating as fast as the stator field rotates. In the illustrative example, the stator field makes one complete revolution per cycle of the supply source. Consequently, synchronous speed of the illustrated motor is attained when the rotor R makes one complete revolution for each cycle of alternating supply current.

When the synchronous speed of the rotor is attained, the flow of current over wires W1 to W3 from a constant voltage source diminishes from a fairly heavy starting value to a comparatively slight running value, as is common with induction motors generally.

The illustrated motor has been designed to operate smoothly and satisfactorily at a constant synchronous speed of 24,000 revolutions per minute (400 revolutions per second), and thus requires a current supply (not shown) over wires W1 to W3 of 400 cycles per second.

It has been found that motors constructed according to the disclosure and operated from a 400-cycle source reach the noted synchronous speed within a small fraction of a minute, with a temperature rise on the order of 12° centigrade.

If desired, the wound stator 18 (the inductor) and the hysteresis cup 14 (the follower) could be interchanged, making 18 part of the rotor and 14 part of the stator. In any case, the interchanged arrangement would require brushes and slip rings for the supply wires W1 to W3, which may be no particular drawback in a larger motor. The noted high rotor speed (24,000 r.p.m.) of the disclosed motor, however, would render the windings 19 of the interchanged structure subject to damage or destruction.

While we have described above the principles of our invention in connection with specific apparatus, it is to be clearly understood that this description is made only by way of example, and not as a limitation to the scope of our invention.

We claim:

1. A stator for an electric induction motor comprising a stack of aligned ring-like laminations provided with a toroidal winding having generally radial end portions disposed outwardly of the ends of the stack, a ring-like mounting plate at one end of the wound stack disposed outside of the adjacent end portion of the winding in alignment with the stack, and means bonding the mounting plate with the said adjacent end portion of the winding and with the adjacent end lamination of the stack.

2. A stator according to claim 1, wherein the said mounting plate has a hollow hub fixed concentrically therewith and extending outwardly therefrom, the hub serving to permit accurate aligned mounting of the stator and serving to receive the mounting shaft of an associated rotor.

3. A stator according to claim 1, wherein the said mounting plate has an open segment to permit free terminal access to the said winding.

4. An electric induction gyroscopic motor comprising a rotor and an annular stator telescoped therein, the rotor comprising a central shaft, a gyroscopic weight member concentrically fixed with the shaft and having an annular recess at one end concentric with the shaft, an annular hysteresis member receiving the shaft and being received in said recess in the weight member, the hysteresis member having an annular recess at one end concentric with the shaft, the said stator being received in the last said annular recess.

5. An electric induction hysteresis motor comprising a rotor and an annular stator telescoped therein, the rotor comprising a central shaft, and an annular hysteresis member concentrically fixed with the shaft, the hysteresis member having an intermediate annular recess at one end concentric with the shaft, the hysteresis member thereby comprising a single-member structure closed at one end from which concentric cylindrical hysteresis portions extend to define said annular recess, the said stator being received in the said annular recess.

6. An inductor for an induction electric motor which includes two parts comprising a stator and a rotor cooperatively associated for rotation of the rotor by magnetic-torque interaction between stator and rotor, one of the said two parts comprising a follower and including a magnetic structure providing two concentric surfaces defining an annular inductor-receiving space concentric with the axis of rotation, the other one of the said two parts comprising the said inductor, the inductor having a magnetic core comprising an annulus of magnetic material adapted to be disposed concentrically within said space and having inner and outer surfaces then disposed in spaced facing relationship respectively with the said surfaces of the follower to provide two concentric annular operating magnetic gaps through which the said magnetic-torque interaction occurs, the inductor including a toroidal winding for the said annulus to induce the said magnetic-torque interaction, the annulus having a series of outer, and a series of inner, recessed winding-receiving openings extending longitudinally therethrough, the said winding comprising interconnected winding sections, each said section traversing a said outer opening and an adjacent one of said inner openings to leave the said inner and outer surfaces of the annulus free of winding turns, while inducing flux circumferentially within its encircled portion of the annulus, the said outer openings being equal in number to the said inner ones and being symmetrically offset circumferentially therefrom to provide an increased inter-opening cross-sectional area of magnetic material encircled by the respective winding sections.

References Cited in the file of this patent

UNITED STATES PATENTS

| | | |
|---|---|---|
| 1,004,437 | King | Sept. 26, 1911 |
| 2,041,875 | Stoller | May 26, 1936 |
| 2,423,345 | Roters | July 1, 1947 |
| 2,772,046 | Shomphe | Nov. 27, 1956 |

FOREIGN PATENTS

| | | |
|---|---|---|
| 899,530 | Germany | Dec. 14, 1953 |

UNITED STATES PATENT OFFICE

CERTIFICATE OF CORRECTION

Patent No. 2,935,630

May 3, 1960

George L. Jones et al.

It is hereby certified that error appears in the printed specification of the above numbered patent requiring correction and that the said Letters Patent should read as corrected below.

Column 4, line 9, for "and" read -- to --; column 6, line 63, list of References Cited, under UNITED STATES PATENTS, for "King" read -- Kimble --.

Signed and sealed this 8th day of November 1960.

(SEAL)

Attest:

KARL H. AXLINE
Attesting Officer

ROBERT C. WATSON
Commissioner of Patents